(12) United States Patent
Tanaka et al.

(10) Patent No.: US 11,742,529 B2
(45) Date of Patent: Aug. 29, 2023

(54) FLUORIDE ION SECONDARY BATTERY

(71) Applicant: HONDA MOTOR CO., LTD., Tokyo (JP)

(72) Inventors: Akihisa Tanaka, Saitama (JP); Yoshiyuki Morita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/669,370

(22) Filed: Feb. 11, 2022

(65) Prior Publication Data

US 2022/0285740 A1     Sep. 8, 2022

(30) Foreign Application Priority Data

Mar. 3, 2021   (JP) ................................. 2021-033759

(51) Int. Cl.
*H01M 10/38*   (2006.01)
*H01M 4/58*    (2010.01)
*H01M 4/62*    (2006.01)

(52) U.S. Cl.
CPC ........... *H01M 10/38* (2013.01); *H01M 4/582* (2013.01); *H01M 4/62* (2013.01); *H01M 4/625* (2013.01); *H01M 2300/008* (2013.01)

(58) Field of Classification Search
CPC ........ H01M 10/38; H01M 4/582; H01M 4/62; H01M 4/625; H01M 2300/008; H01M 10/05; H01M 10/0562
See application file for complete search history.

(56) References Cited

FOREIGN PATENT DOCUMENTS

WO        2019187942 A1     10/2019

*Primary Examiner* — Helen Oi K Conley
(74) *Attorney, Agent, or Firm* — CKC & Partners Co., LLC

(57) ABSTRACT

A fluoride ion secondary battery, comprising: a positive electrode layer, a solid electrolyte layer, and a negative electrode layer, wherein the positive electrode layer comprises a positive electrode active material; the positive electrode active material comprises a composite fluoride comprising copper and a fluoride; the solid electrolyte comprises $BaCaF_4$; the negative electrode layer comprises a negative electrode active material, a conductive aid, and a solid electrolyte; the negative electrode active material comprises a lanthanoid fluoride doped with the alkaline earth metal fluoride; the conductive aid comprises a carbon material, the solid electrolyte contained in the negative electrode layer comprises at least one of $BaCaF_4$ and $SrCaF_4$; and the lanthanoid fluoride doped with the alkaline earth metal fluoride forms a composite with the carbon material.

6 Claims, 1 Drawing Sheet

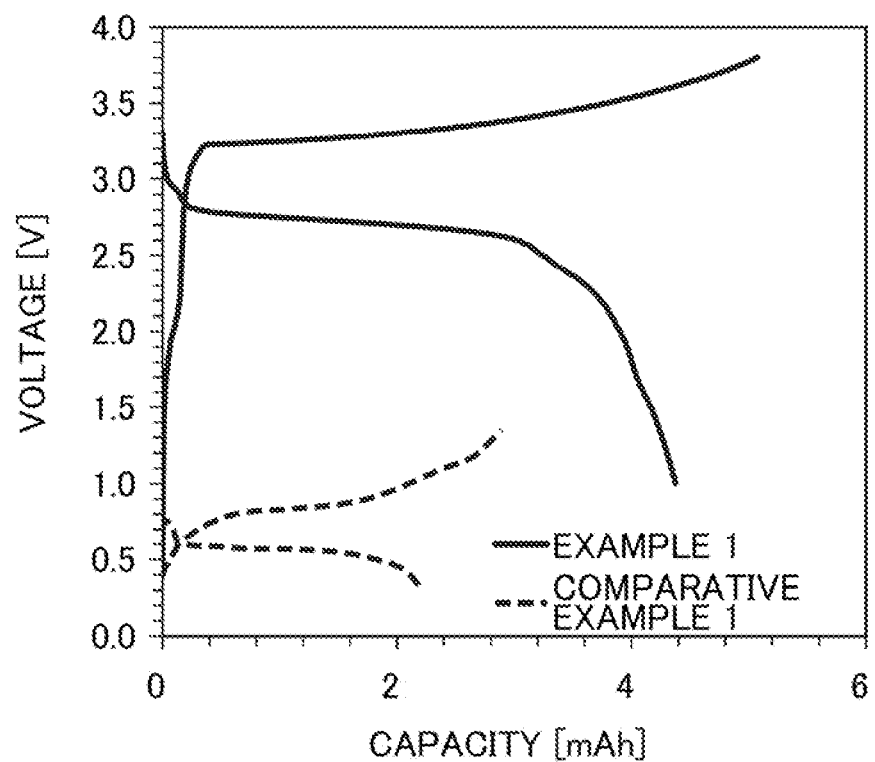

FLUORIDE ION SECONDARY BATTERY

This application is based on and claims the benefit of priority from Japanese Patent Application No. 2021-033759, filed on 3 Mar. 2021, the content of which is incorporated herein by reference.

BACKGROUND OF THE INVENTION

Field of the Invention

The present invention relates to a fluoride ion secondary battery.

Related Art

Conventionally, a lithium ion secondary battery is widely prevalent as a secondary battery having a high energy density. The lithium ion secondary battery includes a separator disposed between a positive electrode and a negative electrode and is filled with an electrolytic solution.

The electrolytic solution for the lithium ion secondary battery may have a safety problem against heat because the electrolytic solution usually includes a flammable organic solvent.

Therefore, a fluoride ion secondary battery has been considered as an all-solid battery in which a solid electrolyte layer is disposed between a positive electrode layer and a negative electrode layer.

It is known to use a composite fluoride of a metal and a fluoride as a positive electrode active material of a fluoride ion secondary battery (see, for example, Patent Document 1)

Patent Document 1: PCT International Publication No. WO2019/187942

SUMMARY OF THE INVENTION

However, it is required to further improve the discharge capacity and energy density of the fluoride ion secondary battery.

An object of the present invention is to provide a fluoride ion secondary battery excellent in discharge capacity and energy density.

One aspect of the present invention relates to a fluoride ion secondary battery, including a positive electrode layer, a solid electrolyte layer, and a negative electrode layer. The positive electrode layer includes a positive electrode active material;
the positive electrode active material includes a composite fluoride including copper and a fluoride;
the solid electrolyte layer includes $BaCaF_4$;
the negative electrode layer includes a negative electrode active material, a conductive aid, and a solid electrolyte;
the negative electrode active material includes a lanthanoid fluoride doped with the alkaline earth metal fluoride;
the conductive aid includes a carbon material;
the solid electrolyte included in the negative electrode layer includes at least one of $BaCaF_4$ and $SrCaF_4$; and
the lanthanoid fluoride doped with the alkaline earth metal fluoride forms a composite with the carbon material.

The lanthanoid fluoride may be one or more types of compounds selected from the group consisting of $LaF_3$, $CeF_3$, $SmF_3$, and $NdF_3$.

The alkaline earth metal fluoride may be one or more types of compounds selected from the group consisting of $CaF_2$, $SrF_2$, and $BaF_2$.

The lanthanoid fluoride doped with the alkaline earth metal fluoride may be one or more types of compounds selected from the group consisting of $La_{0.9}Ba_{0.1}F_{2.9}$, $Ce_{0.95}Ba_{0.05}F_{2.95}$, $Ce_{0.95}Sr_{0.05}F_{2.95}$ and $Ce_{0.95}Ca_{0.05}F_{2.95}$.

The solid electrolyte contained in the negative electrode layer may contain nanoparticles of at least one of $BaCaF_4$ and $SrCaF_4$.

The solid electrolyte layer may include nanoparticles of $BaCaF_4$.

According to the present invention, it is possible to provide a fluoride ion secondary battery having excellent discharge capacity and energy density.

BRIEF DESCRIPTION OF THE DRAWINGS

FIGURE is a diagram showing the first charge and discharge curves of all-solid fluoride ion secondary batteries of Example 1 and Comparative Example 1.

DETAILED DESCRIPTION OF THE INVENTION

Below, the embodiments of the present invention will be described.

<Fluoride Ion Secondary Battery>

The fluoride ion secondary battery of the present embodiment has a positive electrode layer, a solid electrolyte layer, and a negative electrode layer, and for example, a positive electrode current collector, a positive electrode layer, a solid electrolyte layer, a negative electrode layer, and a negative electrode current collector are sequentially disposed.

[Negative Electrode Layer]

The negative electrode layer includes a negative electrode active material, a conductive aid, and a solid electrolyte. Here, the negative electrode active material includes a lanthanoid fluoride doped with the alkaline earth metal fluoride, the conductive aid includes a carbon material, and the solid electrolyte includes at least one of $BaCaF_4$ and $SrCaF_4$. Furthermore, the lanthanoid fluoride doped with the alkaline earth metal fluoride forms a composite with the carbon material. In other words, the negative electrode layer includes a composite of a lanthanoid fluoride doped with the alkaline earth metal fluoride and a carbon material (hereinafter, also referred to as a composite of a lanthanoid fluoride and a carbon material).

Since the negative electrode layer contains a lanthanoid fluoride doped with the alkaline earth metal fluoride, ion conductivity is improved. Further, since the negative electrode layer contains the composite of a lanthanoid fluoride and a carbon material, electron conductivity is improved. Furthermore, since the negative electrode layer contains at least one of $BaCaF_4$ and $SrCaF_4$, defluorination potential is low. Therefore, the discharge capacity of the fluoride ion secondary battery of the present embodiment is improved.

(Negative Electrode Active Material)

The lanthanoid fluoride is not particularly limited. Examples thereof include $LaF_3$, $CeF_3$, $SmF_3$, and $NdF_3$. Two or more thereof may be used in combination.

The alkaline earth metal fluoride to be used for doping the lanthanoid fluoride is not particularly limited, as long as it has ion conductivity. Examples thereof include $CaF_2$, $SrF_2$, and $BaF_2$. Two or more thereof may be used in combination.

Examples of the lanthanoid fluoride doped with the alkaline earth metal fluoride include $La_{0.9}Ba_{0.1}F_{2.9}$, $Ce_{0.95}Ba_{0.05}F_{2.95}$, $Ce_{0.95}Sr_{0.05}F_{2.95}$, and $Ce_{0.95}Ca_{0.05}F_{2.95}$. Two or more thereof may be used in combination.

The negative electrode active material may further include an additional negative electrode active material other than the lanthanoid fluoride doped with the alkaline earth metal fluoride.

The additional negative electrode active material other than the lanthanoid fluoride doped with the alkaline earth metal fluoride is not particularly limited, as long as it is a negative electrode active material used for fluoride ion secondary batteries.

(Conductive Aid)

The carbon material is not particularly limited as long as it has electron conductivity, and may be carbon black. Examples of the carbon black include furnace black, ketjen black, and acetylene black. Two or more thereof may be used in combination.

The conductive aid may further include an additional conductive aid other than the carbon material.

The additional conductive aid other than the carbon material is not particularly limited, as long as it is a conductive aid used for fluoride ion secondary batteries.

(Composite of Lanthanoid Fluoride and Carbon Material)

In the composite of the lanthanoid fluoride and the carbon material, for example, at least a portion of a surface of a lanthanoid fluoride particle is coated with the carbon material.

The composite of the lanthanoid fluoride and the carbon material has preferably a particle diameter of 10 µm or less and further preferably a particle diameter of 5 µm or less. The composite of the lanthanoid fluoride and the carbon material having the particle diameter of 10 µm or less improves the ion conductivity and electron conductivity.

A mass ratio of the carbon material to the lanthanoid fluoride doped with the alkaline earth metal fluoride is preferably 3% by mass or more and 20% by mass or less from the viewpoint of a balance between the ion conductivity and electron conductivity.

The negative electrode layer preferably contains 60% by mass or more and 70% by mass or less of the composite of the lanthanoid fluoride and the carbon material. When the negative electrode layer contains 60% by mass or more and 70% by mass or less of the composite of the lanthanoid fluoride and the carbon material, the discharge capacity of the fluoride ion secondary battery of the present embodiment is improved.

[Method for Producing Composite of Lanthanoid Fluoride and Carbon Material]

A method for producing the composite of the lanthanoid fluoride and the carbon material (hereinafter also referred to as composite) includes a first step in which a mixed powder of the lanthanoid fluoride and the alkaline earth metal fluoride is obtained, a second step in which the mixed powder of the lanthanoid fluoride and the alkaline earth metal fluoride is mixed with the carbon material to thereby obtain a composite precursor, and a third step in which the composite precursor is calcined to thereby obtain a composite.

The first step is a step of mixing the lanthanoid fluoride with the alkaline earth metal fluoride to thereby obtain the mixed powder of the lanthanoid fluoride and the alkaline earth metal fluoride. In other words, the mixing of the lanthanoid fluoride with the alkaline earth metal fluoride can shorten a solid phase diffusion distance of elements derived from the lanthanoid fluoride and the alkaline earth metal fluoride during calcining. Furthermore, after calcining, a mixed powder of the lanthanoid fluoride and the alkaline earth metal fluoride in which no crystal structure of the lanthanoid fluoride or the alkaline earth metal fluoride remains can be obtained.

A method for mixing the lanthanoid fluoride with the alkaline earth metal fluoride is not particularly limited. Either a dry method or a wet method may be used. For example, these may be mixed with a mortar.

Note that, conditions under which the lanthanoid fluoride is mixed with the alkaline earth metal fluoride, for example, a temperature, time, etc. may be appropriately set.

Furthermore, the mixed powder of the lanthanoid fluoride and the alkaline earth metal fluoride may be ground in the first step.

As a method for grinding the mixed powder of the lanthanoid fluoride and the alkaline earth metal fluoride, a method of grinding by using, for example, a ball mill may be mentioned.

The second step is a step of mixing the mixed powder of the lanthanoid fluoride and the alkaline earth metal fluoride obtained in the first step with the carbon material to thereby obtain the composite precursor.

In the method for producing the composite, the second step is performed before the third step to thereby mix the mixed powder of the lanthanoid fluoride and the alkaline earth metal fluoride with the carbon material in advance. Thus, the composite precursor in which the carbon material is disposed on the surface of the mixed powder of the lanthanoid fluoride and the alkaline earth metal fluoride is obtained.

Therefore, the composite precursor is calcined in the third step to thereby obtain a composite in which at least a portion of a surface of lanthanoid fluoride particle doped with alkaline earth metal fluoride is coated with the carbon material.

Furthermore, since the carbon material is disposed on the surface of the mixed powder of the lanthanoid fluoride and the alkaline earth metal fluoride in the second step, the mixed powder of the lanthanoid fluoride and the alkaline earth metal fluoride is inhibited from grain-growing or coarsening due to fusion of particle boundaries in a crystallization process in the third step, resulting in a composite having a particle diameter approximately the same as that of the mixed powder of the lanthanoid fluoride and the alkaline earth metal fluoride.

A method for mixing the mixed powder of the lanthanoid fluoride and the alkaline earth metal fluoride with the carbon material in the second step is not particularly limited. Either a dry method or a wet method may be used. For example, these may be mixed with a mortar.

Note that, when the mixed powder of the lanthanoid fluoride and the alkaline earth metal fluoride is mixed with the carbon material, shearing is preferably applied.

Furthermore, conditions under which the mixed powder of the lanthanoid fluoride and the alkaline earth metal fluoride is mixed with the carbon material, for example, a temperature, time, etc. may be appropriately set.

Moreover, the composite precursor may be ground in the second step.

As a method for grinding the composite precursor, a method of grinding by using, for example, a ball mill or a mortar, may be mentioned.

The third step is a step of calcining the composite precursor obtained in the second step to thereby obtain a composite.

Since the composite precursor in which the carbon material is disposed on the surface of the mixed powder of the lanthanoid fluoride and the alkaline earth metal fluoride is obtained in the second step, the mixed powder of the lanthanoid fluoride and the alkaline earth metal fluoride is inhibited from grain-growing or coarsening due to fusion of particle boundaries in a crystallization process in the third step, resulting in a composite having a particle diameter approximately the same as that of the composite precursor.

Note that, conditions under which the composite precursor is calcined may be appropriately set.

Furthermore, the composite may be ground in the third step.

The composite may be ground with, for example, a mortar.

(Solid Electrolyte)

It is preferable that the solid electrolyte contains nanoparticles of at least one of $BaCaF_4$ and $SrCaF_4$. This makes it easy to secure an ion conduction path, and this improves discharge capacity of the fluoride ion secondary battery of the present embodiment.

The particle size of nanoparticles of at least one of $BaCaF_4$ and $SrCaF_4$ is, for example, from 30 nm or more and 200 nm or less.

The mass ratio of the total amount of $BaCaF_4$ and $SrCaF_4$ to cerium fluoride doped with an alkaline earth metal fluoride is preferably 0.36 or more and 0.92 or less from the viewpoint of balance between the ion conductivity and the defluorination potential.

The solid electrolyte may further include a solid electrolyte other than $BaCaF_4$ and $SrCaF_4$.

The solid electrolyte other than $BaCaF_4$ and $SrCaF_4$ is not particularly limited as long as it is a solid electrolyte used in fluoride ion secondary batteries.

[Positive Electrode Layer]

The positive electrode layer includes a positive electrode active material, and may further include a conductive aid, a solid electrolyte, and the like.

(Positive Electrode Active Material)

The positive electrode active material includes a composite fluoride formed of copper and a fluoride. Therefore, the discharge capacity of the fluoride ion secondary battery is improved. The fluoride is not particularly limited as long as it has ion conductivity, and examples thereof include lead fluoride ($PbF_2$), tin fluoride ($SnF_2$), bismuth fluoride ($BiF_3$), lanthanum fluoride ($LaF_3$), cerium fluoride ($CeF_3$), sodium fluoride (NaF), potassium fluoride (KF), barium fluoride ($BaF_2$), and the like, and two or more types thereof may be used in combination. Of these, sodium fluoride (NaF), potassium fluoride (KF) and barium fluoride ($BaF_2$) are preferred.

The content of copper in the composite fluoride of copper and a fluoride is preferably 40 at % or more and 70 at % or less, and more preferably 50 at % or more and 60 at % or less. When the content of copper in the composite fluoride of copper and a fluoride is 40 at % or more and 70 at % or less, the discharge capacity of the fluoride ion secondary battery is improved.

The particle diameter of the composite fluoride of copper and a fluoride is preferably 100 nm or less, and more preferably 50 nm or less. When the particle diameter of the composite fluoride of copper and a fluoride is 50 nm or less, since the diffusion distance of fluoride ions is short, a utilization ratio of the positive electrode active material is improved.

The content of the composite fluoride of copper and a fluoride in the positive electrode layer is preferably 25% by mass or more and 70% by mass or less, and more preferably 50% by mass or more and 68% by mass or less, from the viewpoint of balance between the ion conductivity and the electron conductivity.

The positive electrode active material may further include a positive electrode active material other than the composite fluoride of copper and a fluoride.

The positive electrode active material other than the composite fluoride of copper and a fluoride is not particularly limited as long as it is a positive electrode active material used in fluoride ion secondary batteries.

(Method for Producing Composite Fluoride of Copper and Fluoride)

A method for producing the composite fluoride of copper and a fluoride includes an aerosol process in which a raw material melt containing copper and a fluoride is sprayed under reduced pressure.

Specifically, first, copper and a fluoride are weighed and then mixed to obtain raw material mixed powder. At this time, if necessary, a classification process of the raw material mixed powder may be performed. Next, the raw material mixed powder is fused into a raw material melt by thermal plasma or the like, and then the raw material melt is sprayed into a chamber under a reduced pressure environment. Next, the sprayed raw material melt is cooled to be in a form of nanoparticles, and a composite fluoride of copper and a fluoride is obtained.

(Conductive Aid)

Examples of the conductive aid include a carbon material, etc.

The carbon material may be carbon black.

Examples of the carbon black include furnace black, ketjen black, and acetylene black. Two or more thereof may be used in combination.

(Solid Electrolyte)

Examples of the solid electrolyte include lanthanoid fluorides each doped with an alkaline earth metal fluoride, $BaCaF_4$, $PbSnF_4$, etc. Of these, lanthanoid fluorides each doped with an alkaline earth metal fluoride are preferred in terms of ion conductivity and withstand voltage.

As the lanthanoid fluoride doped with the alkaline earth metal fluoride, a compound similar to that of a lanthanoid fluoride, which is doped with an alkaline earth metal fluoride and which is used as the negative electrode active material described above, can be used.

Further, the lanthanoid fluoride doped with the alkaline earth metal fluoride may form a composite with a carbon material in the same manner as in the lanthanoid fluoride described above which is used as the negative electrode active material and which is doped with an alkaline earth metal fluoride.

In this case, it is preferable to manufacture a positive electrode layer by wet mixing the composite fluoride of copper and a fluoride, with the composite of the lanthanoid fluoride doped with the alkaline earth metal fluoride and the carbon material and then drying. This suppresses aggregation of the composite fluoride of copper and a fluoride, and the composite of the lanthanoid fluoride doped with the alkaline earth metal fluoride and the carbon material, and this improves the charge and discharge capacity of the fluoride ion secondary battery of the present embodiment.

Examples of solvents used for wet mixing the composite fluoride of copper and a fluoride, with the composite of the lanthanoid fluoride doped with the alkaline earth metal fluoride and the carbon material include cyclohexane, dimethyl carbonate, etc.

The composite of the lanthanoid fluoride and the carbon material has preferably a particle diameter of 10 μm or less and has further preferably a particle diameter of 5 μm or less. The composite of the lanthanoid fluoride and the carbon material having the particle diameter of 10 μm or less improves the ion conductivity and electron conductivity.

The mass ratio of the carbon material to the lanthanoid fluoride doped with the alkaline earth metal fluoride is preferably 3% by mass or more and 20% by mass or less from the viewpoint of balance between the ion conductivity and the electron conductivity.

[Solid Electrolyte Layer]

The solid electrolyte layer comprises $BaCaF_4$. Therefore, the energy density of the fluoride ion secondary battery of the present embodiment is improved.

It is preferable that the solid electrolyte layer contains nanoparticles of $BaCaF_4$. This improves the energy density of the fluoride ion secondary battery of the present embodiment.

The particle size of nanoparticles of at least one of $BaCaF_4$ and $SrCaF_4$ is, for example, from 30 nm to 200 nm.

The solid electrolyte layer may further include a solid electrolyte other than $BaCaF_4$.

The additional solid electrolyte other than $BaCaF_4$ is not particularly limited, as long as it is a solid electrolyte used for fluoride ion secondary batteries.

[Positive Electrode Current Collector and Negative Electrode Current Collector]

Examples of the positive electrode current collector include, for example, a gold foil. Furthermore, examples of the negative electrode current collector include, for example, a gold foil, etc.

EXAMPLES

Although Examples of the present invention will be described hereafter, the present invention is not limited to Examples.

Example 1

An all-solid fluoride ion secondary battery was produced as follows. Note that, unless otherwise described, each of the steps mentioned below was performed within a purge-type glove box DBO-1.5B equipped with an argon gas recycle purification system (manufactured by Miwa Manufacturing Co., Ltd.).

[Production of $Ce_{0.95}Ba_{0.05}F_{2.95}$-AB Composite]
(First Step)

8.598 g of $CeF_3$ powder (manufactured by Sigma-Aldrich; purity: 99.99%) and 0.402 g of $BaF_2$ powder (manufactured by Kojundo Chemical Laboratory Co., Ltd.; purity: 99.9%) were weighed and then mixed with an agate mortar and pestle for 5 to 10 minutes to thereby obtain a $CeF_3$—$BaF_2$ mixed powder.

The $CeF_3$—$BaF_2$ mixed powder and 20 silicon nitride grinding balls each having a diameter of 10 mm (manufactured by Fritsch) were charged into a vessel dedicated to Premium Line PL-7 (manufactured by Fritsch) serving as an 80 cc silicon nitride ball mill pot, and then sealed.

The sealed ball mill pot was taken from the glove box and then subjected to a grinding treatment with a ball mill. In this case, grinding treatment conditions were as described below.
Number of revolutions: 800 rpm
Grinding treatment time: 60 minutes
Number of times of grinding treatment: 40 times
Downtime between grinding treatments: 5 minutes
Reverse rotation: ON The ball mill pot was taken into the glove box and then the $CeF_3$—$BaF_2$ mixed powder was collected from the ball mill pot.
(Second Step)

Using an agate mortar and pestle, 3.08 g of the $CeF_3$—$BaF_2$ mixed powder was mixed with 0.22 g of Denka Black (manufactured by Denka Company Limited) serving as acetylene black (AB) to thereby obtain a $Ce_{0.95}Ba_{0.05}F_{2.95}$-AB composite precursor.

The $Ce_{0.95}Ba_{0.05}F_{2.95}$-AB composite precursor, 20 zirconia grinding balls each having a diameter of 10 mm (manufactured by Fritsch), and 20 silicon nitride grinding balls each having a diameter of 10 mm (manufactured by Fritsch) were charged into a vessel dedicated to Premium Line PL-7 (manufactured by Fritsch) serving as an 80 cc silicon nitride ball mill pot, and then sealed.

The sealed ball mill pot was taken from the glove box and then subjected to a grinding treatment with a ball mill. In this case, grinding treatment conditions were as described below.
Number of revolutions: 800 rpm
Grinding treatment time: 60 minutes
Number of times of grinding treatment: 40 times
Downtime between grinding treatments: 5 minutes
Reverse rotation: ON The ball mill pot was taken into the glove box and then the $Ce_{0.95}Ba_{0.05}F_{2.95}$-AB composite precursor was collected from the ball mill pot. The collected $Ce_{0.95}Ba_{0.05}F_{2.95}$-AB composite precursor was ground with an agate mortar and pestle for 5 to 10 minutes.
(Third Step)

The $Ce_{0.95}Ba_{0.05}F_{2.95}$-AB composite precursor was transferred into an alumina crucible and then calcined using a small size electric furnace KSL-1100X (manufactured by MTI) to thereby obtain a $Ce_{0.95}Ba_{0.05}F_{2.95}$-AB composite. In this case, calcination conditions were as described below.
Flow rate of argon gas: 300 cc/min
Heating rate: 184° C./h
Maximum achievable temperature: 1100° C.
Holding time at maximum achievable temperature: 1 hour
Cooling rate: No control
Cooling method: Standing to cool The $Ce_{0.95}Ba_{0.05}F_{2.95}$-AB composite was collected from the alumina crucible and then ground with an agate mortar and pestle for 5 to 10 minutes.
[Preparation of $BaCaF_4$]
(Premixing)

After weighing 690 mg of barium fluoride powder (manufactured by High Purity Chemical Laboratory Co., Ltd., purity: 99%) and 310 mg of calcium fluoride powder (manufactured by High Purity Chemical Laboratory Co., Ltd., purity: 99.9%), they were premixed using an agate mortar and pestle for about 1 hour to obtain a $BaF_2$—$CaF_2$ mixed powder.
(Aerosol Process)

A hermetically sealable powder hopper in which the $BaF_2$—$CaF_2$ mixed powder was enclosed was taken from the glove box and then connected to a high-frequency induction thermal plasma nanoparticle synthesizer TP-40020NPS (manufactured by JOEL Ltd.).

Argon gas was supplied to a plasma torch, and the $BaF_2$—$CaF_2$ mixed powder was fused by thermal plasma to form a $BaF_2$—$CaF_2$ melt, and then the $BaF_2$—$CaF_2$ melt was injected into a chamber under a reduced pressure environment. The $BaF_2$—$CaF_2$ melt injected into the chamber was cooled to be in a form of nanoparticles, and was converted to $BaCaF_4$. Then, the $BaCaF_4$ was collected by an exhaust gas filter located downstream of the device. Next, the upstream and downstream of the exhaust filter were shut off by valves, and then the hermetically sealable powder hopper was carried into the interior of the glove box, and the $BaCaF_4$ powder was collected.

[Production of Powder Composition for Negative Electrode Layer]

636 mg of the $Ce_{0.95}Ba_{0.05}F_{2.95}$-AB composite, 364 mg of $BaCaF_4$, and 40 g of silicon nitride grinding balls each having a diameter of 2 mm (manufactured by Fritsch) were charged into a vessel dedicated to Premium Line PL-7 (manufactured by Fritsch) serving as a 45 cc silicon nitride ball mill pot, and then sealed.

The sealed ball mill pot was taken from the glove box and then subjected to a grinding treatment with a ball mill. In this case, grinding treatment conditions were as described below.
Number of revolutions: 200 rpm
Grinding treatment time: 15 minutes
Number of times of grinding treatment: 10 times
Downtime between grinding treatments: 5 minutes
Reverse rotation: ON The ball mill pot was taken into the glove box and then a powder composition for a negative electrode layer was collected from the ball mill pot.

[Preparation of Cu—$BaF_2$ Composite Fluoride]
(Premixing)

After weighing 480 mg of Cu metal powder having an average particle diameter of 1 μm (manufactured by High Purity Chemical Laboratory Co., Ltd., purity 99.99%) and 190 mg of barium fluoride powder (manufactured by High Purity Chemical Laboratory Co., Ltd., purity 99.9%), they were premixed using an agate mortar and pestle for about 1 hour to obtain a Cu—$BaF_2$ mixed powder.

(Aerosol Process)

A hermetically sealable powder hopper in which the Cu—$BaF_2$ mixed powder was enclosed was taken from the glove box and then connected to a high-frequency induction thermal plasma nanoparticle synthesizer TP-40020NPS (manufactured by JOEL Ltd.).

Argon gas was supplied to a plasma torch, and the Cu—$BaF_2$ mixed powder was fused by thermal plasma to form a Cu—$BaF_2$ melt, and then the Cu—$BaF_2$ melt was injected into a chamber under a reduced pressure environment. The Cu—$BaF_2$ melt injected into the chamber was cooled to be in a form of nanoparticles, and was converted to a Cu—$BaF_2$ composite fluoride. Then, the Cu—$BaF_2$ composite fluoride was collected by an exhaust gas filter located downstream of the device. Next, the upstream and downstream of the exhaust filter were shut off by valves, and then the hermetically sealable powder hopper was carried into the interior of the glove box, and the Cu—$BaF_2$ composite fluoride was collected.

[Production of Powder Composition for Positive Electrode Layer]

670 mg of the Cu—$BaF_2$ composite fluoride, 330 mg of the $Ce_{0.95}Ba_{0.05}F_{2.95}$-AB composite, 10 g of cyclohexane, and 40 g of silicon nitride grinding balls each having a diameter of 2 mm (manufactured by Fritsch) were charged into a vessel dedicated to Premium Line PL-7 (manufactured by Fritsch) serving as a 45 cc silicon nitride ball mill pot, and then sealed.

The sealed ball mill pot was taken from the glove box and then subjected to a grinding treatment with a ball mill. In this case, grinding treatment conditions were as described below.
Number of revolutions: 200 rpm
Grinding treatment time: 15 minutes
Number of times of grinding treatment: 40 times
Downtime between grinding treatments: 5 minutes
Reverse rotation: ON After the content of the ball mill pot was dried under vacuum, the ball mill pot was carried into the glove box to collect the powder composition for positive electrode layers.

[Powder for Solid Electrolyte Layer]

As powder for solid electrolyte layers, $BaCaF_4$ which was used for producing the powder composition for negative electrode layers was used.

[Production of all-Solid Fluoride Ion Secondary Battery]

A cylindrical pellet cell was produced through powder-compaction by pressing at a pressure of 40 MPa using a tablet molding device. Specifically, a gold foil having a thickness of 20 μm (manufactured by The Nilaco Corporation; purity: 99.99%) serving as a negative electrode current collector, 30 mg of the powder composition for negative electrode layers, 20 mg of the powder for solid electrolyte layers, 20 mg of the powder composition for positive electrode layers, and a gold foil having a thickness of 20 μm (manufactured by The Nilaco Corporation; purity: 99.99%) serving as a positive electrode current collector were charged into the tablet molding device in this order, resulting in a pellet cell.

Comparative Example 1

An all-solid fluoride ion secondary battery was prepared in the same manner as in Example 1, except that the powder for negative electrode layers, the powder for solid electrolyte layers and the all-solid fluoride ion secondary battery were prepared in the following manner.

[Production of Powder for Negative Electrode Layers ($PbSnF_4$-AB Composite)]

After mixing 63.7% by mass of lead fluoride powder (manufactured by Kojundo Chemical Laboratory Co., Ltd.), 29.6% by mass of tin fluoride powder (manufactured by Kojundo Chemical Laboratory Co., Ltd.), and 6.7%. by mass of Denka Black (manufactured by Denka Company Limited) as AB in a ball mill, the resultant mixture was calcined at 400° C. for 1 hour under an argon atmosphere, resulting in a $PbSnF_4$-AB composite.

[Preparation of Powder ($Ce_{0.95}Ba_{0.05}F_{2.95}$) for Solid Electrolyte Layers]

(First Step)

After weighing 8.598 g of $CeF_3$ powder (manufactured by Sigma-Aldrich Co., Ltd., purity: 99.99%) and 0.402 g of $BaF_2$ powder (manufactured by High Purity Chemical Laboratory Co., Ltd., purity: 99.9%), the mixture was mixed using an agate mortar and pestle for 5 to 10 minutes to obtain $CeF_3$—$BaF_2$ mixed powder.

The $CeF_3$—$BaF_2$ mixed powder and 20 silicon nitride grinding balls (manufactured by Fritsch) were charged into a vessel dedicated to Premium Line PL-7 (manufactured by Fritsch) serving as an 80 cc silicon nitride ball mill pot, and then sealed.

The sealed ball mill pot was taken from the glove box and then subjected to a grinding treatment with a ball mill. At this time, grinding treatment conditions were as described below.
Number of revolutions: 800 rpm
Grinding treatment time: 60 minutes
Number of times of grinding treatment: 40 times
Downtime between grinding treatments: 5 minutes
Reverse rotation: ON The ball mill pot was brought into the glove box and then the $CeF_3$—$BaF_2$ mixed powder was collected from the ball. mill pot.

(Second Step)

The $CeF_3$—$BaF_2$ mixed powder was transferred to an alumina crucible and then calcined using a small size electric furnace KSL-1100X (manufactured by MTI) to thereby obtain $Ce_{0.95}Ba_{0.05}F_{2.95}$. In this case, calcination conditions were as described below.

Flow rate of argon gas: 300 cc/min
Heating rate: 184° C./h
Maximum achievable temperature: 1100° C.
Holding time at maximum achievable temperature: 1 hour
Cooling rate: No control
Cooling method: Standing to cool $Ce_{0.95}Ba_{0.05}F_{2.95}$ was collected from the alumina crucible and then ground using an agate mortar and pestle for 5 to 10 minutes.

[Production of all-Solid Fluoride Ion Secondary Battery]

A cylindrical pellet cell was produced through powder-compaction by pressing at a pressure of 40 MPa using a tablet molding device. Specifically, an aluminum foil having a thickness of 20 μm (manufactured by The Nilaco Corporation; purity: 99+%) serving as a negative electrode current collector, 30 mg of the powder for negative electrode layers, 150 mg of the powder for solid electrolyte layers, 20 mg of the powder composition for positive electrodes layer, and a gold foil having a thickness of 20 μm (manufactured by The Nilaco Corporation; purity: 99.99%) serving as a positive electrode current collector were charged into the tablet molding device in this order, resulting in a pellet cell.

[Particle Diameter of Powder]

(Particle Sizes of Cu—$BaF_2$ Composite Fluoride and $BaCaF_4$)

A specific surface area of each powder was measured using a full automatic specific surface area analyzer Macsorb HM model-1208 (manufactured by Mountech Co., Ltd.) and then a particle diameter was calculated from the specific surface area and a true density of the powder.

The particle sizes of the Cu—$BaF_2$ composite fluoride and $BaCaF_4$ were 18 nm and 110 nm, respectively.

(Particle Diameters of $Ce_{0.95}Ba_{0.05}F_{2.95}$-AB Composite and $Ce_{0.95}Ba_{0.05}F_{2.95}$ and $PbSnF_4$-AB Composite)

Each powder was photographed using a scanning electron microscope SU-6600 (manufactured by Hitachi High-Tech Corporation) and then powders on SEM images of a plurality of visual fields were measured for length, which was determined as a particle diameter.

As a result, the $Ce_{0.95}Ba_{0.05}F_{2.95}$-AB composite, and $Ce_{0.95}Ba_{0.05}F_{2.95}$ and $PbSnF_4$-AB composite had particle diameters of 50 μm, 100 μm and 100 μm, respectively.

[Charge and Discharge Test]

The all-solid fluoride ion secondary batteries were subjected to a charge and discharge test at a constant current. Specifically, the charge and discharge test at a constant current was performed using a potentio-galvanostat device SI1287/1255B (manufactured by Solartron Analytical) in vacuum at 140° C. under the following conditions: current during charging and discharging: 0.04 mA; upper limit and lower limit of voltage in Example 1: 3.8 V and 1.0 V, respectively and upper limit and lower limit of voltage in Comparative Example 1: 1.3 V and 0.3 V, respectively; and starting with charging.

FIG. 1 shows initial charge and discharge curves of the all-solid fluoride ion secondary batteries of Example 1 and Comparative Example 1.

FIG. 1 demonstrates that the all-solid fluoride ion secondary battery of Example 1 had higher charge and discharge capacity than the all-solid fluoride ion secondary battery of Comparative Example 1.

Table 1 shows evaluation results for the discharge capacity, 50% discharge voltage, and energy density of the all-solid fluoride ion secondary batteries of Example 1 and Comparative Example 1.

TABLE 1

|  | Example 1 | Comparative Example 1 |
| --- | --- | --- |
| Discharge capacity [mAh] | 4.37 | 2.20 |
| 50% discharge voltage [V] | 2.7 | 0.6 |
| Energy density [Wh/kg] | 169 | 6 |

From Table 1, it can be seen that the all-solid fluoride ion secondary battery of Example 1 had a higher charge and discharge capacity, a higher 50% discharge voltage, and a higher energy density than the all-solid fluoride ion secondary battery of Comparative Example 1.

What is claimed is:

1. A fluoride ion secondary battery, comprising:
a positive electrode layer, a solid electrolyte layer, and a negative electrode layer,
wherein the positive electrode layer comprises a positive electrode active material,
the positive electrode active material comprises a composite fluoride comprising copper and a fluoride,
the solid electrolyte layer comprises $BaCaF_4$,
the negative electrode layer comprises a negative electrode active material, a conductive aid, and a solid electrolyte,
the negative electrode active material comprises a lanthanoid fluoride doped with the alkaline earth metal fluoride,
the conductive aid comprises a carbon material,
the solid electrolyte comprised in the negative electrode layer comprises at least one of $BaCaF_4$ and $SrCaF_4$, and
the lanthanoid fluoride doped with the alkaline earth metal fluoride forms a composite with the carbon material.

2. The fluoride ion secondary battery according to claim 1, wherein the lanthanoid fluoride is one or more types of compounds selected from the group consisting of $LaF_3$, $CeF_3$, $SmF_3$, and $NdF_3$.

3. The fluoride ion secondary battery according to claim 1, wherein the alkaline earth metal fluoride is one or more types of compounds selected from the group consisting of $CaF_2$, $SrF_2$, and $BaF_2$.

4. The fluoride ion secondary battery according to claim 1, wherein the lanthanoid fluoride doped with the alkaline earth metal fluoride is one or more types of compounds selected from the group consisting of $La_{0.95}Ba_{0.1}F_{2.9}$, $Ce_{0.95}Ba_{0.05}F_{2.95}$, $Ce_{0.95}Sr_{0.05}F_{2.95}$ and $Ce_{0.95}Ca_{0.05}F_{2.95}$.

5. The fluoride ion secondary battery according to claim 1, wherein the solid electrolyte contained in the negative electrode layer comprises nanoparticles of at least one of $BaCaF_4$ and $SrCaF_4$.

6. The fluoride ion secondary battery according to claim 1, wherein the solid electrolyte layer comprises nanoparticles of $BaCaF_4$.

* * * * *